(12) United States Patent
Astakhov et al.

(10) Patent No.: US 9,843,388 B1
(45) Date of Patent: Dec. 12, 2017

(54) LASER COMMUNICATIONS

(71) Applicant: Amazon Technologies, Inc., Seattle, WA (US)

(72) Inventors: Vadim Astakhov, Seattle, WA (US); Mathew Wolfgang Walter Lehwess, San Francisco, CA (US); Kyle Adam Lichtenberg, Issaquah, WA (US); Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 14/733,927

(22) Filed: Jun. 8, 2015

(51) Int. Cl.
*H04B 10/118* (2013.01)
*H04B 10/50* (2013.01)
*H04B 7/185* (2006.01)

(52) U.S. Cl.
CPC ......... *H04B 10/118* (2013.01); *H04B 10/503* (2013.01); *H04B 7/1851* (2013.01); *H04B 7/18513* (2013.01); *H04B 7/18515* (2013.01); *H04B 7/18521* (2013.01)

(58) Field of Classification Search
None
See application file for complete search history.

(56) References Cited

U.S. PATENT DOCUMENTS

| | | | | |
|---|---|---|---|---|
| 3,215,842 A | * | 11/1965 | Thomas | H04B 10/1125 359/290 |
| 4,878,718 A | * | 11/1989 | Gilbreath-Frandsen | G02B 5/32 359/12 |
| 5,767,953 A | * | 6/1998 | McEwan | G01C 3/08 356/5.01 |
| 7,366,125 B1 | * | 4/2008 | Elliott | H04B 7/18519 370/316 |
| 7,826,752 B1 | * | 11/2010 | Zanoni | H04B 10/5055 398/186 |
| 2012/0068880 A1 | * | 3/2012 | Kullstam | G01S 3/38 342/54 |

OTHER PUBLICATIONS

Buck et al., NASA Laser Communication System Sets Record with Data Transmissions to and from Moon, NASA news release, Oct. 22, 2013, 2 pages, Washington, D.C.
Lothar Belz, Optical Data Link Successfully Demonstrated Between Fighter Plane and Ground Station, Airbus Defence and Space, Press, News Archive, Dec. 19, 2013, Manching, Germany.

* cited by examiner

*Primary Examiner* — Darren E Wolf
(74) *Attorney, Agent, or Firm* — Thorpe North & Western, LLP (57) ABSTRACT

Technology for laser communications is provided. In one example, a method may include generating a communication for transmission from a first terrestrial computing device to a second terrestrial computing device and encoding the communication as an optical transmission from a first laser array in communication with the first terrestrial computing device. The optical transmission may be transmitted, using the first laser array, to a first satellite and relayed from the first satellite to a second satellite using a second laser array at the first satellite. The optical transmission may be further relayed from the second satellite to the second terrestrial computing device using a third laser array at the second satellite. The lasers in the first, second and third laser arrays may be low power laser diodes configured for a power level less than 1 kW.

13 Claims, 8 Drawing Sheets

LASER COMMUNICATIONS

BACKGROUND

Computing devices often utilize a communication network or a series of communication networks to exchange data. Companies and organizations operate computer networks that interconnect a number of computing devices to support computing operations or provide services to other parties. The computing systems may be located in a single geographic location or may be located in multiple, distinct geographic locations (e.g., interconnected via private or public communication networks). For instance, larger data centers or data processing centers may include a number of interconnected computing systems that provide computing resources to customers of the data center. Using virtualization technologies, utilization of data center resources may be increased by configuring a single physical computing device to host one or more computing instances that appear to operate as independent computing devices to users of a data center.

Communications between devices in a data center or across a network are often carried over physical copper wiring, such as telephone wiring or coaxial cabling. Fiber optic communications have more recently replaced copper wiring to enable high speed data communications. Installation of copper wires or fiber optic cables may be challenging due to existing infrastructure, distance, cost, geographical barriers, and a variety of other factors. Wireless technologies have also been developed to communicate data to devices over microwave, GSM/GPRS/EDGE, WCDMA, HSPA, LTE, WiMAX™, Bluetooth®, Wi-Fi®, or other communications protocols. Wireless technologies may communicate wirelessly between towers, routers or the like and avoid some of the issues involved with installation of copper or fiber for physical communication channels, but wireless communications may often have limited range, receive interference from infrastructure or other radio signals, and have other issues. Satellites positioned over 20,000 miles above the Earth have been used in some cases to communicate with terrestrial satellite routers at radio frequencies greater than 11,000 MHz. Such satellite communications generally have high latency, however, and are thus unsuitable for many communication applications.

DETAILED DESCRIPTION

A technology for satellite laser communications is provided. In one example, a method may include generating a communication for transmission from a first terrestrial computing device to a second terrestrial computing device and encoding the communication as an optical transmission from a first laser array in communication with the first terrestrial computing device. The optical transmission may be transmitted, using the first laser array, to a first satellite and relayed from the first satellite to a second satellite using a second laser array at the first satellite. The optical transmission may be further relayed from the second satellite to the second terrestrial computing device using a third laser array at the second satellite. The lasers in the first, second and third laser arrays may be low power laser diodes configured for a power level less than 1 kW.

In another example, a method for providing laser communications may be provided which includes generating a communication for transmission from a first terrestrial computing device to a second terrestrial computing device. For example, the communication may include one or more data packets. Virtually any type of communication that is sent between computing devices using conventional communication technologies may be transmitted using the present technology, including TCP/IP (transmission control protocol/internet protocol) packets, raw binary data, etc. The communication may be encoded as an optical transmission. For example, the data packets to be transmitted may be encoded as light to be emitted from a laser array in communication with the first terrestrial computing device. Encoding the communication may include predicting the atmospheric distortion that will affect the optical transmission as the optical transmission travels through the atmosphere and pre-distorting the optical transmission such that the atmospheric distortion operates as an adaptive optic to compensate for and correct the pre-distortion before the optical transmission arrives at a receiver. The optical transmission may be transmitted to the first satellite using the laser array. Transmitting the optical signal using the laser array may include controlling firing of individual lasers in the laser array to generate the signals of light with the determined pre-distortion. The distortion of a signal may be referred to as a perturbation. By firing the individual lasers at different times based on the predicted atmospheric distortion, an inversely perturbed signal may be created.

The optical transmission may include routing instructions for the first satellite to relay the optical transmission to the second terrestrial computing device, via a second satellite, using second laser arrays available on the first and second satellites. Each of the first and second satellites, as well as the first and second terrestrial computing devices may include optical detectors for detecting optical transmissions transmitted from another of the devices, in addition to possessing laser arrays for emitting optical transmissions. The lasers in the laser arrays may be low power lasers and the optical detectors may be configured to detect the low power optical transmissions. In one example, the lasers in the laser array may be laser diodes configured for a power level less than 1 kW, or less than 100 W, or less than 10 W, or less than 1 W.

FSO technology used in the past has been limited to clear weather operation and is generally applied to ground-toground based communications, which introduces distance limitations due to the curvature of the earth. (Line of sight propagation restrictions limit FSO such that FSO communications generally cannot travel over the horizon or behind obstacles). Further limitations with conventional FSO technologies include susceptibility to solid objects such as local bird life, snow or rain passing between the optical transceiver (TX) and the optical receiver (RX). Due at least in part to these limitations, better established microwave or radio communications have conventionally been used in place of FSO technologies.

Figure 1:
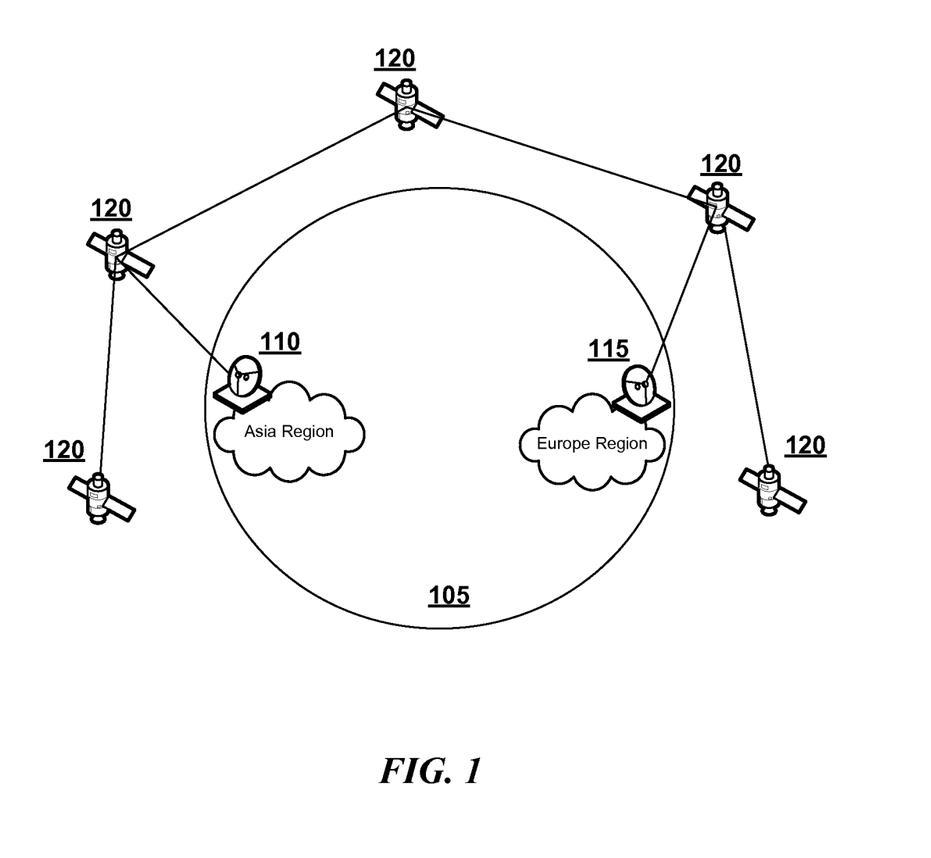
FIG. 1 is a schematic overview of a satellite communication network for communicating between terrestrial regions in accordance with an example of the present technology.

Reference will now be made to FIG. 1. The present technology may provide satellites 120 with capabilities to send and receive FSO communications (or more simply, "optical communications") to and from other satellites 120 or terrestrial stations 110, 115. Using laser encoding and attenuation reduction, the present technology may enable optical communication bandwidths in excess of 10 terabits per second (Tbps). The present technology opens up many opportunities for ground to space and space to ground optical communications, along with the capability to exceed both the technical capabilities of existing terrestrial fiber networks and provide a lower cost alternative.

This laser based communication technology may include components that work together to create a ground to space and space to ground communications network that has the ability to provide greater speeds than terrestrial based fiber communication and at a lower latency and cheaper cost per gigabit. For example, the present technology may provide very high data rates (>1-10 Terabits per channel) for data transmitted between terrestrial, or ground based (Earth 105), systems to small, less expensive satellites in orbit around the Earth 105. The satellites 120 may orbit at an approximate orbital distance of 1,000 to 700 kilometers or less, and may orbit within the Earth's exosphere. In some examples, the satellites 120 may not be limited to the exosphere, but may also include satellites 120 configured to orbit within the thermosphere. Satellites with lower orbits may have shorter usable life spans due to gravity pulling the satellites out of orbit over time, but may enable higher rates of transmission of data with lower latency.

The satellites 120 may be miniaturized satellites which are artificial satellites of low mass and size, usually under 500 kg (1,100 lb). The satellites 120 may include small satellites, micro satellites and/or nano satellites. In one example, the satellites 120 may be CubeSats. A CubeSat may be a miniaturized satellite having a cube shape, typically with a volume of exactly one liter (10 cm cube) and having a low mass, such as approximately 1.33 kilograms or less, for example. A number of satellites 120 may be stacked or placed together (e.g., two or more cubes together) in a rocket or other vehicle for launch into the exosphere, thermosphere, stratosphere, etc. Multiple satellites 120 may be mechanically coupled together in a common housing or separate housing or may be configured to orbit in proximity to one another, such as within a proximity of 100 meters or less, 10 meters or less, or five meters or less.

Each satellite 120 and ground station 110, 115 may be equipped with optical communications equipment (open air, laser based), providing the transmit (TX) and receive (RX) ends of a two-way FSO or optical communications link. Each satellite 120 may act as an active repeater for any data communications. Each satellite 120 may include a built-in routing engine enabling the satellite 120 to route the data communications either to a peer satellite router (or any satellite in line of sight of the transmitting satellite) or to an appropriate ground station 110 or 115. Determination of whether to transmit data to another satellite 120 when the optical communication is intended for a ground station may depend upon the distance to the destination ground station 110 or 115 and the positional relationship of the satellite 120 to the ground station 110 or 115. For example, a satellite closest to the destination ground station may be used to transmit a communication to the destination ground station. In another example, if multiple satellites are in position to communicate with the destination ground station, a satellite used to communicate with the ground station may be selected to minimize latency, even if not the closest satellite to the ground station, while selecting the satellite to ensure a desired quality of transmission.

The satellites 120 may include a gyroscope to stabilize the satellites 120 to reduce rotation, spinning, etc. that may affect the transmission or receipt of optical communications. In another example, the satellites 120 may include a convex lens for use in receiving optical communications over a wide range of angles. In another example, laser arrays, mirrors or the like on the satellites 120 may be steerable to steer a transmission angle or receipt angle. In another example, the satellites 120 may include at least two selected from the group consisting of: a gyroscope, a convex lens, a steerable laser array or a steerable mirror.

The present technology may enable the maintenance of dedicated communication links between any two points on the Earth 105. These points or ground stations 110, 115, may be situated at common internet Points of Presence (POPs) to allow greater access to the pre-existing internet backbone in the relevant region (e.g., Asia Region or Europe Region, as illustrated in FIG. 1) and other commercial parties residing in these co-location facilities. With available bandwidths in the range of up to 10 terabits per second, the present technology has the ability to provide higher bandwidth and lower latency links between two points on the earth than terrestrial communications. For example, considering two data centers, one located in Dublin Ireland and the other located in North Virginia USA, the distance used by the laser communications network (line of Site+atmospheric delay) of the present technology may be less distance than the path data communications currently take over submarine cables between the North American and European continents. Lower latency allows for higher throughput and more reliable communications. The present laser communications network can therefore reduce or remove the reliance on terrestrial based fiber networks that are susceptible to breakages and more importantly reduce the need for submarine fibers, which are extremely expensive and very high latency in nature.

In the present technology, atmospheric signal perturbations may be corrected using adaptive optics. Adaptive optics may reduce the effect of wavefront distortions using a deforming mirror or a liquid crystal array to compensate for the distortion. Deformable mirrors are mirrors whose surface is deformable to achieve wavefront control and correction of optical aberrations. Deformable mirrors may be used in combination with wavefront sensors and real-time control systems in adaptive optics.

The present technology may pre-distort an optical signal for atmospheric correction rather than correcting for a signal distorted by the atmosphere. In other words, the signal may be distorted using the laser array at the transmission end of a communication as compared with conventional correction of distortion at a receiving end of a communication. In a similar manner as adaptive optics determine atmospheric distortions to wavefronts, distortions may be predicted before the distortion occurs. This predicted distortion may be used to perturb an optical communication relative to the predicted distortion of the atmosphere. Information about atmospheric perturbation taken in real time by a probing laser, may be used for adapting the laser array for perturbing the optical output.

In one example, an optical signal may be reflected from a deformable mirror before being transmitted through the atmosphere. The deformable mirror may be deformed to cause the inverse perturbation. In another example, a laser array used to emit the optical communication may be controlled such that output from individual lasers in the array may be delayed, advanced, power changed, or modified such that the output from the array as a whole is a perturbed signal. The perturbed signal may be an inversely perturbed signal. The pre-distorted signals are corrected while propagating through the atmosphere to result in a desired version of the optical signal.

The laser array may use phased array optics (PAO). Phased array optics is the technology of controlling the phase of light waves transmitting or reflecting from a two-dimensional surface by means of adjustable surface elements. By dynamically controlling the optical properties of a surface on a microscopic scale, it is possible to steer the direction of light beams, or the view direction of sensors, without any moving parts. Hardware associated with beam steering applications is commonly called an optical phased array (OPA). Phased array beam steering is used for optical switching and multiplexing in optoelectronic devices, and for aiming laser beams on a macroscopic scale. Conventional uses of PAO or OPA involve using laser arrays to generate a single high energy beam. In contrast, the present technology may utilize low energy, small, fiber-laser diodes, which may eliminate or significantly reduce interaction with molecules prevalent with high energy laser applications. Further, the optical communication of the present technology may be used with perturbed or pre-distorted optical signals. One or more laser arrays may be used to transmit an optical communication. For example, a laser array may be a 10×10 array including 100 lasers configured to emit an optical signal at different times, such as with nanosecond output differences and/or frequency differences. The lasers in the array may collectively emit a complicated waveform which may be corrected by the atmosphere and detected by a detector at a receiver.

In some applications, the present technology may facilitate moving data between data centers with minimized reliance on terrestrial systems. Terrestrial systems are expensive and time consuming to install, and are frequently destroyed by digging with construction equipment, ocean storms, or the like.

Data communications systems located within a satellite further enable the use of satellites 120 to offer storage services, routing, data transfer, compute services and so forth. Some or all of these computing services may be facilitated by the communications or may be entirely provided through the communication system. In other words, while some example implementations involve communication between terrestrial data centers, other example implementations may locate at least a portion of the data centers or the services in orbit around the earth. Data storage, processing and the like may be provided by computing hardware included in one or more of the satellites 120. In one example, a small data center (e.g., 5-10 servers), routing equipment, or the like may be placed in the satellites for communicating with terrestrial computing systems.

Figure 2:
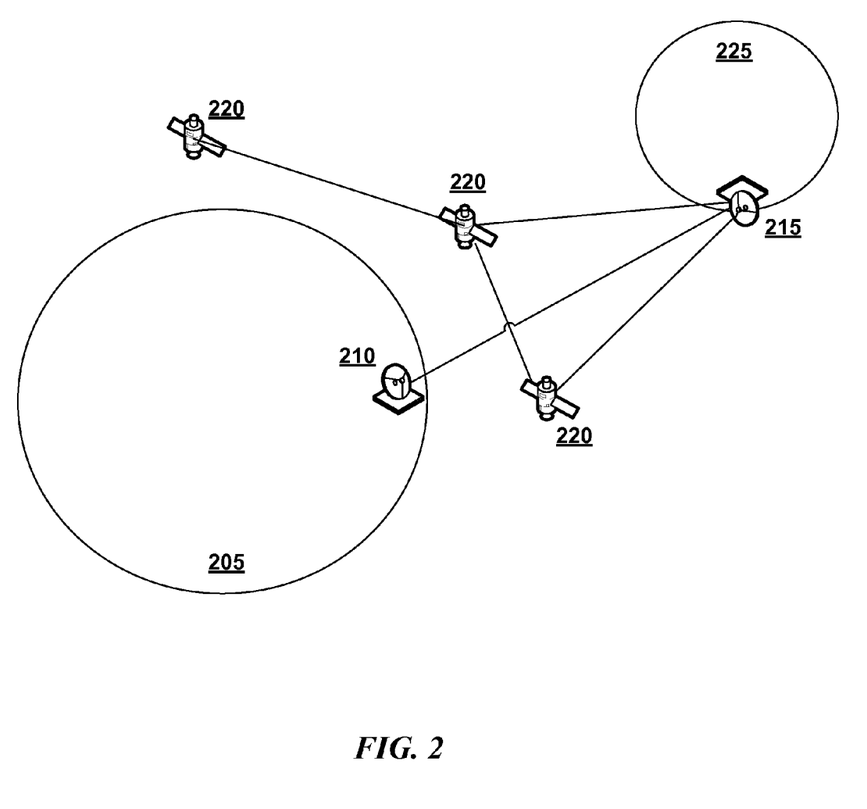
FIG. 2 is a schematic overview of a satellite communication network for communicating between data centers on the Earth and on the Moon in accordance with an example of the present technology.

In another example, a data center, routing equipment, and other computing services may be placed on the Moon or other celestial bodies (e.g., planets, asteroids, etc.) for communicating with satellite networks and/or terrestrial computing systems. FIG. 2 illustrates such an example system. In the example of FIG. 2, a data center 215 may be located on the Moon 225. The data center 215 may be in communication with one or more satellites 220 in a satellite network and may be in communication with a terrestrial data center 210. The satellites 220 may optionally be configured to communicate primarily with the data center 210 on the Earth 205 or the data center 214 on the Moon 225 or may communicate with either. The data centers 210, 215 on the Earth 205 and Moon 225 may be configured to communicate directly as illustrated, or may be configured to communicate via the satellites. Establishing a service provider environment and/or communications network in orbit, such as in the exosphere, on the Moon 215, or the like, may reduce a likelihood of damage or destruction from natural disasters, man-made problems, and the like, increasing the reliability of services.

Figure 3:
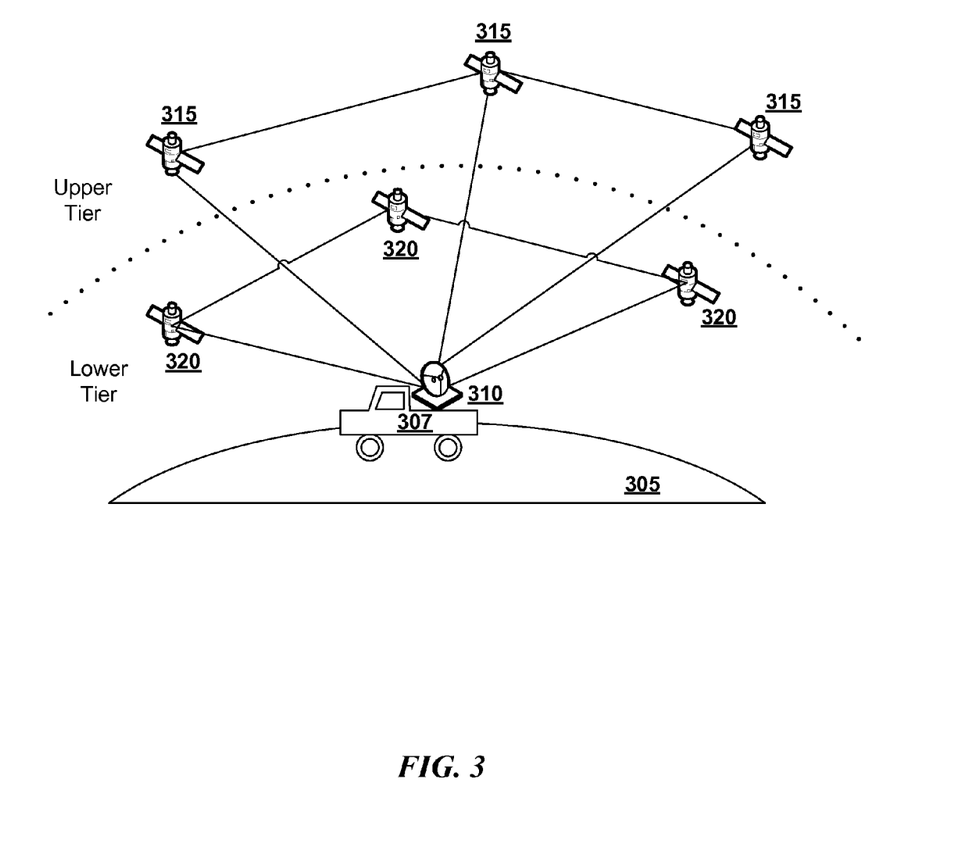
FIG. 3 is a schematic overview of a tiered satellite communication network in accordance with an example of the present technology.

Reference will be made to FIG. 3. A network of miniaturized satellites 315, 320 may be provided in orbit around the Earth 305. The satellites 315, 320 may orbit within the exosphere or within a boundary closer to Earth 305. For example, the layer directly below the exosphere is the thermosphere and the boundary between the two is called the thermopause. The bottom of the exosphere may also be referred to as the exobase. The altitude of the lower boundary of the exosphere varies. When the Sun is active around the peak of the sunspot cycle, x-rays and ultraviolet radiation from the Sun heat and "puff up" the thermosphere—raising the altitude of the thermopause to heights around 1,000 km (620 miles) above Earth's surface. When the Sun is less active during the low point of the sunspot cycle, solar radiation is less intense and the thermopause recedes to within about 500 km (310 miles) of Earth's surface. Despite the variation in altitude of the exosphere, the satellites 315 of the present technology may maintain a consistent orbit, although the orbital altitude may decrease due to the effects of gravity and orbit decay over time. As used herein, a satellite 315, 320 with an orbit within the exosphere during a fluctuation in the altitude of the exosphere may be considered an exospheric satellite, even if during another fluctuation of the exosphere, the satellite is in the thermopause or thermosphere. Similarly, a thermospheric satellite may be a satellite having an orbit within the thermosphere during at least a fluctuation in a boundary of the thermosphere.

The satellites 315, 320 for the present technology may orbit the earth within approximately 1,500 km above the Earth's 305 surface, or within 1,000 km, or within 800 km, or within 700 km, or within 500 km, or within 300 km, or within 200 km. A lower limit for the altitude range may be 150 km or greater, or 200 km or greater, or 300 km or greater, or 500 km or greater, or 700 km or greater. In other words, the satellites may orbit within the exosphere or the thermosphere. While some definitions of the outer limits of the exosphere extend to around 190,000 km (120,000 miles) above the Earth's 305 surface, the present satellites 315, 320 may typically be within the altitude ranges described above. Maintaining a closer orbital altitude may assist in reducing latency of communications. However, at lower altitudes, the usable lifespan of the satellites is reduced. For example, without upward boosts from thrusters or the like, a satellite 320, 315 may generally remain in orbit for about five years with an initial orbit at an elevation of 300-400 km. A satellite 320, 315 may generally remain in orbit for up to a hundred years or more at 700 km. At 200 km, the lifespan may be reduced to approximately one year. Accordingly, the desired latency of the communications may be balanced with the desired lifespan of the satellites 320, 315.

FIG. 3 illustrates multiple tiers of satellites 320, 315. While two tiers are illustrated, including an upper tier, including satellites 315, and a lower tier, including satellites 320, additional tiers may also be provided. In other words, networks of satellites 320, 315 may be provided at two or more staggered altitudes. Different tiers of satellites 320, 315 may be used to provide different levels of latency, Quality of Service (QoS) or the like. For example, satellites in the lower tier may provide lower latency and better QoS than in the upper tier. Less latency sensitive services may be provided using the upper tier satellites 315 at a lower cost than the satellites 320 of the lower tier. Data may be encrypted or unencrypted and may be sent using standard or proprietary protocols, depending on the desired application. In one example, the upper tier satellites 315 and the lower tier satellites 320 may comprise isolated satellite networks which do not communicate between one another. In another example, the upper tier satellites 315 and the lower tier satellites 320 may comprise interconnected satellite networks.

The satellites 320, 315 may be non-geosynchronous satellites. In other words, the satellites 320, 315 may have a period of rotation which is asynchronous with the Earth's rotation. A geosynchronous satellite may be positioned at a significantly higher altitude, such as at approximately 40,000 km. The satellites 320, 315 in the present technology may form a network of satellites. Each satellite 320, 315 may maintain a line of sight with at least one or two other satellites. The satellite network may be any suitable type of network, such as a mesh network, star network, ring network, bus network, hierarchical network, or the like.

In one example, the higher altitude satellites 320, 315, in open space, may use a single laser may be used to transmit a signal to a destination satellite in space. Terrestrial systems having an atmosphere through which to send optical communications may benefit from a larger number of lasers to form a complicated waveform encoding the data being transmitted while compensating for atmospheric distortions.

The satellites 320, 315 of FIG. 3 (or of FIG. 1) may be used for a variety of applications in addition to those previously mentioned. For example, the satellites may be used to capture satellite imagery. One or more of the satellites may be equipped with a camera configured to capture high resolution still images or video. With current satellite imaging systems, bandwidth and infrastructure are limited, resulting in imagery of the Earth 305 being captured over the course of days, and imagery may be months old when the imagery is retrieved and made available for use. The satellite network of the present technology may capture imagery and quickly transmit the imagery to the Earth for weekly, daily, hourly, or even more frequent updates.

In one example, a customer may subscribe to receive updated imagery for one or more geographical coordinates or regions. The imagery for the subscribed coordinates may be stored in a data store which is accessible by the customer to view the updated imagery as the updates are available. Real time video streaming from the camera(s) on the satellites may also be made available. For example, when a 9-1-1 emergency call is received, police may be enabled to view real time video of the location of the call. Because video streaming is typically a one-way communication, latency for streaming video of satellite images of the Earth using the present technology may be within an acceptable margin.

An imaging system may coordinate satellites to capture desired imagery. Satellites 320, 315 may be distributed in different areas of the globe, at different orbital altitudes, and so forth. The imaging system may direct the satellites to capture images of particular locations and may stitch the images together. The stitched images may be divided into squares or the like for displaying a specific area of the stitched images. An imaging system at a ground station 310 may track satellite orbits, divide up regions to be imaged by different satellites, create composite maps, and so forth.

Satellites 320, 315 and ground stations 310 may include transmitters and receivers to assist in redirecting data between data centers, customer locations, etc. In addition, the terrestrial-based transmitters and receivers may be mobile. For example, a transmitter or receiver (e.g., a laser array and laser detector) may be carried in the back of a truck 307 or other vehicle to enable mobility. As the size of the devices decreases, the transmitter and/or receiver may be carried in a backpack, built into a laptop device, or implemented in any other suitable manner.

Figure 4:
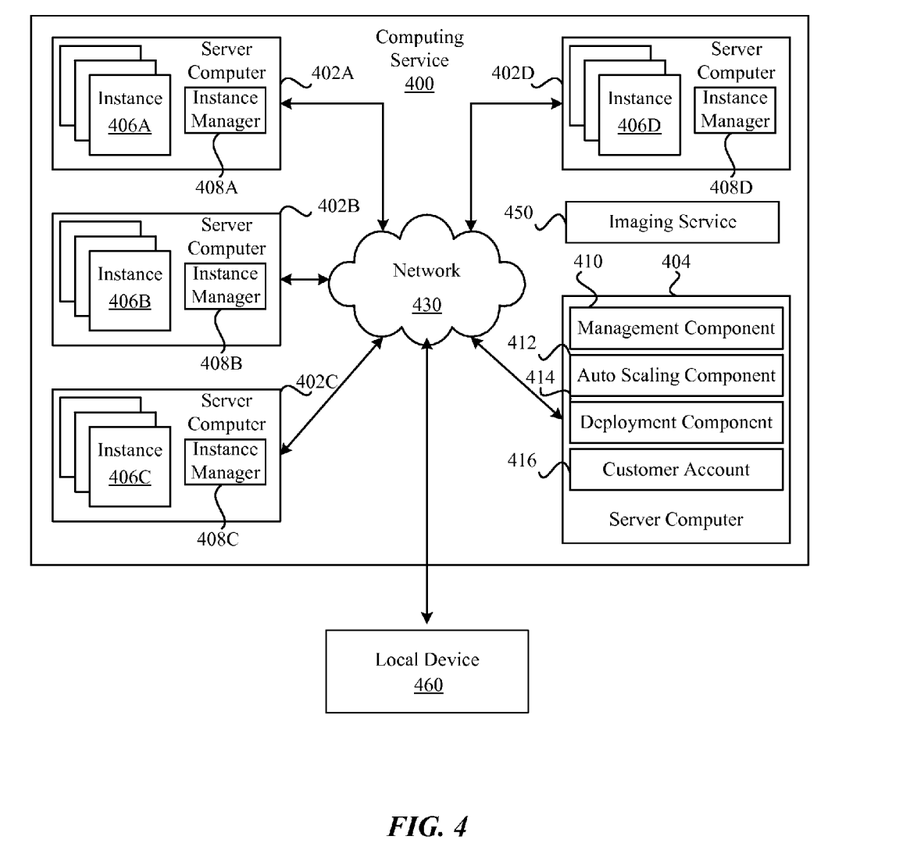
FIG. 4 is a schematic overview of a virtual computing resource provider in accordance with an example of the present technology.

Whether for imaging, communications, or other purposes, the satellite communications network may be used to provide services to customers. The satellites 320, 315 may function as data centers or as part of a data center or for communication between data centers in a service provider environment. FIG. 4 illustrates how components of a data center may function as a computing service 400 in a service provider environment to provide a platform for computing instances which the present technology may use to execute nodes as described. The computing service 400 (i.e., the cloud provider or service provider) may be capable of delivery of computing and storage capacity as a service to a community of end recipients. In an example implementation, the computing service may be established for an organization by or on behalf of the organization. That is, the computing service 400 may offer a "private cloud environment." In another implementation, the computing service 400 may support a multi-tenant environment, wherein a plurality of customers operate independently (i.e., a public cloud environment). Generally speaking, the computing service 400 can provide the following models: Infrastructure as a Service ("IaaS"), Platform as a Service ("PaaS"), and/or Software as a Service ("SaaS"). Other models may also be provided. In some implementations, end users access the computing service 400 using networked client devices, such as desktop computers, laptops, tablets, smartphones, etc running web browsers or other lightweight client applications. Those skilled in the art will recognize that the computing service 400 can be described as a "cloud" environment.

The particularly illustrated computing service 400 may include a plurality of server computers 402A-402D. While four server computers are shown, any number may be used, and large centers may include thousands of server computers. The server computers 402A-402D may provide computing resources for executing software instances 406A-406D. In one implementation, the instances 406A-406D may be virtual machines. A virtual machine may be an instance of a software implementation of a machine (i.e. a computer) that executes applications like a physical machine. In the example of virtual machine, each of the servers 402A-402D may be configured to execute an instance manager 408 capable of executing the instances. The instance manager 408 may be a hypervisor or another type of program configured to enable the execution of multiple instances 406 on a single server. Additionally, each of the instances 406 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 404 may be reserved for executing software components for managing the operation of the server computers 402 and the instances 406. For example, the server computer 404 may execute a management component 410. A customer may access the management component 410 to configure various aspects of the operation of the instances 406 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 412 may scale the instances 406 vertically or horizontally based upon rules defined by the customer. In one implementation, the auto scaling component 412 allows a customer to specify scale-up policies for use in determining when new instances should be instantiated, including what type of instance to instantiate, and scale-down policies for use in determining when existing instances should be terminated. The auto scaling component 412 may consist of a number of sub-components executing on different server computers 402 or other computing devices. The auto scaling component 412 may monitor available computing resources over an internal management network and modify resources available based on predictions of need as well as based on actual need.

A deployment component 414 may be used to assist customers in the deployment of new instances 406 of computing resources. The deployment component 414 may have access to account information associated with the instances, such as who is the owner of the account, credit card information, country of the owner, etc. The deployment component 414 may receive a configuration from a customer that includes data describing how new instances 406 should be configured. For example, the configuration may specify one or more applications to be installed in new instances 406, provide scripts and/or other types of code to be executed for configuring new instances 406, provide cache logic specifying how an application cache should be prepared, and other types of information. The deployment component 414 may utilize the customer-provided configuration and cache logic to configure, prime, and launch new instances 406. The configuration, cache logic, and other information may be specified by a customer using the management component 410 or by providing this information directly to the deployment component 414.

Customer account information 416 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 400 may be used to host or provide any number of potential services to customers, such as storage, compute, or other services. In one example, an imaging service 450 may be provided. The imaging service 450 may coordinate the capture of imagery from satellites, stitch the images together, divide the stitched images into squares, and so forth as has been described previously. Other services may also be provided.

A network 430 may be utilized to interconnect the server computers 402A-402D and the server computer 404. The network 430 may be a local area network (LAN) and may be connected to a Wide Area Network (WAN) 440 so that end users may access the computing service 400. It should be appreciated that the network topology illustrated in FIG. 4 has been simplified and that many more networks and networking devices may be utilized to interconnect the various computing systems disclosed herein.

Figure 5:
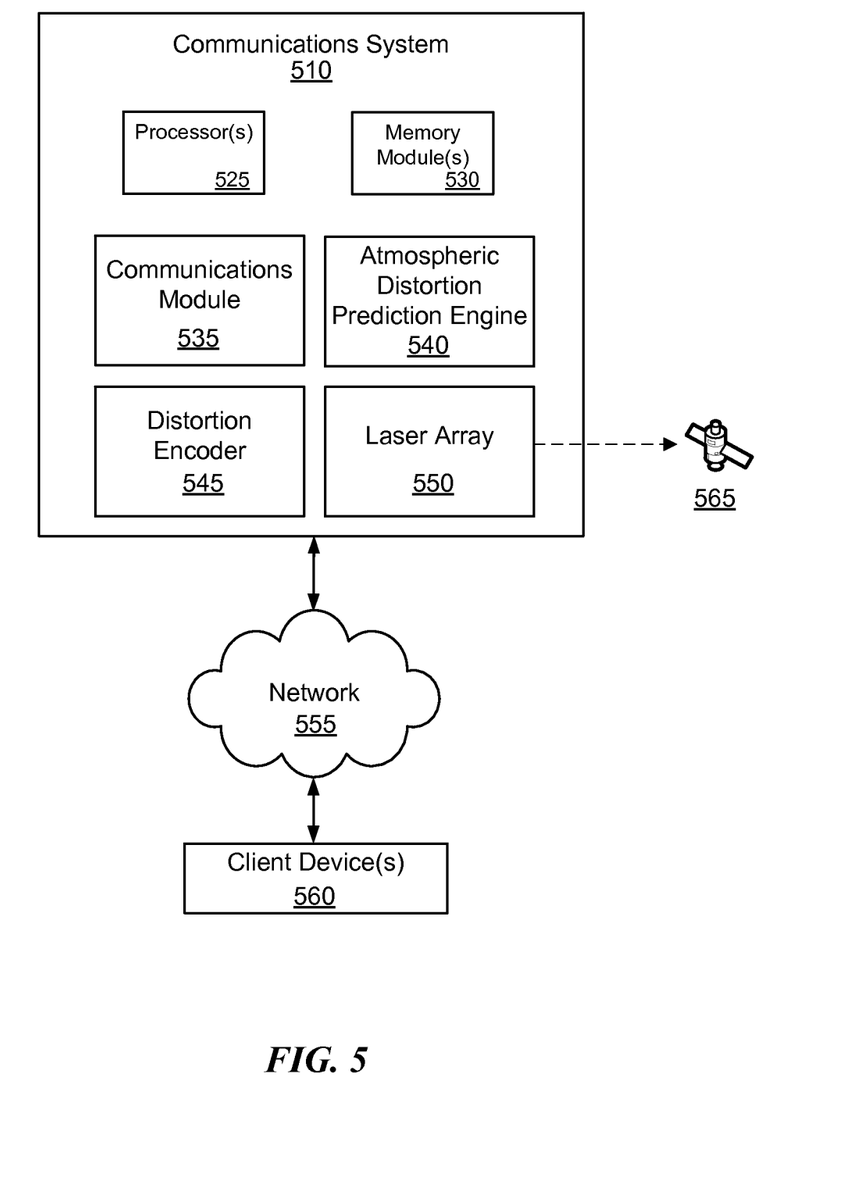
FIG. 5 is a block diagram of a system for a satellite communication system in accordance with an example of the present technology.

Referring now to FIG. 5, a block diagram of a system 510 for implementing a terrestrial station in an laser communication system as illustrated in accordance with an example of the present technology. The system elements may be implemented using one or more computing devices in a service provider environment, such as a server as an example computing device, as well as client devices 560, and may be implemented across a network 555. The system may include a data store 515 and a number of modules 530, 535, 540, 545, 550 for storing and processing data to be used in the coding environment.

Computing services offered by a service provider environment, may include a computing device that executes one or more servers or computing instances on the computing device. One or more servers (e.g. a computing instance operating as a server) may be operated to execute an operating system and implement a communications application which is scalable and asynchronous. A user may create, launch, and terminate servers as desired. The user may have some control over the geographical location of servers or clusters of servers to optimize latency and provide high levels of redundancy.

The user may access and manage the one or more servers over a network 555 connection, such as a connection through the Internet, for example. The user may perform various operations on the servers such as adding, updating, modifying, deleting or other otherwise maintaining software or services on the servers. These operations may be performed by the user from the client device 560. These operations may be performed over an communications network (e.g., network 555). For example, instructions to perform the operations at a data center may be sent over the communications network or the operations may be performed within the network, such as at end points (e.g., terrestrial data centers) or at orbiting nodes (e.g., satellites) within the network.

The server(s) may be a virtual computing instance as previously explained, and the virtual computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisors and virtualization control plane) may provide platforms on which virtual computing instances may be created. In other words, the virtual computing instances may execute on the hardware layer by using the platform provided by the virtualization layer. This computing service architecture that supports computing instances is illustrated in more detail in FIG. 4.

The communications system 510 may include a communications module 535. The communications module 535 may be configured to generate a communication message for optical transmission. For example, the communications module 535 may generate or replicate data packets for transmission to a networked location.

The system 510 may include an atmospheric distortion prediction engine 540. A laser or the like may be used to detect atmospheric conditions, as has been described previously. Based on the detected atmospheric conditions, the atmospheric distortion engine 540 may calculate distortion predicted to occur to transmitted optical signals as the optical signals pass through the atmosphere. The atmospheric distortion prediction engine 540 may calculate the predicted distortion. For example, an inverse of the predicted distortion may be calculated. The predicted distortion may be used to pre-distort optical communications such that the actual atmospheric distortion corrects the optical communication rather than further distorting the optical communication.

The system 510 may include a distortion encoder 545. The distortion encoder 545 may be configured to encode the communication generated by the communications module 535 as the optical transmission. The distortion encoder 545 may encode the optical transmission suitable for transmission from a laser array 550. The distortion encoder 545 may be in communication with the atmospheric distortion prediction engine 540 to receive the calculated predicted distortion. The distortion encoder 545 may be configured to pre-distort the optical transmission such that the atmospheric distortion operates as an adaptive optic to compensate for the pre-distortion. The distortion encoder 545 may pre-distort the optical transmission by individually controlling laser diodes in a laser array 550 to generate a pre-distorted waveform.

The laser array 550 may also be part of the system 510 and may include the individually controllable low power laser diodes, which laser diodes may be configured to emit the optical transmission. The laser array 550 may be configured to emit the optical transmission by controlling firing of individual lasers in the laser array to fire the individual lasers at different times and produce the inversely perturbed signal corresponding to the encoded pre-distortion. The laser array 550 may include a grid of lasers. The laser array 550 may be configured to emit the optical transmission at a transmission rate of greater than 100 Gb/s, or greater than 1 Tb/s or greater than 10 Tb/s and directed toward a satellite 565.

In one example, the system 510 may include an adaptive optics mirror. The adaptive optics mirror may be configured to pre-distort the optical transmission emitted from the laser array based on instructions from the distortion encoder. In other words, rather than using the distortion encoder to cause a distorted waveform to be emitted from the laser array 550, a non-perturbed waveform is emitted and directed to the adaptive optics mirror, which is dynamically deformed based on instructions from the distortion encoder to perform the pre-distortion. Alternatively, a liquid crystal array may be used to pre-distort the communication rather than the adaptive optics mirror.

Client devices 560 may be available to access and interact with the communications system 510 or server in a computing service provider environment 510 or one or more computing instances or clusters, over a network 555. Example client devices 560 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display that may receive and present the message content.

The system 510 may be implemented across one or more computing device(s) connected via a network 555. For example, a computing device may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, one or more processors 525 and one or more memory modules 530. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 5 may be representative of a plurality of client devices 570 that may be coupled to the network 555. The client device(s) 570 may communicate with the computing device over any appropriate network, including an intranet, the Internet, a cellular network, a local area network (LAN), a wide area network (WAN), a wireless data network or a similar network or combination of networks. In one example, the network 555 may be the communications network of the present technology.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 6:
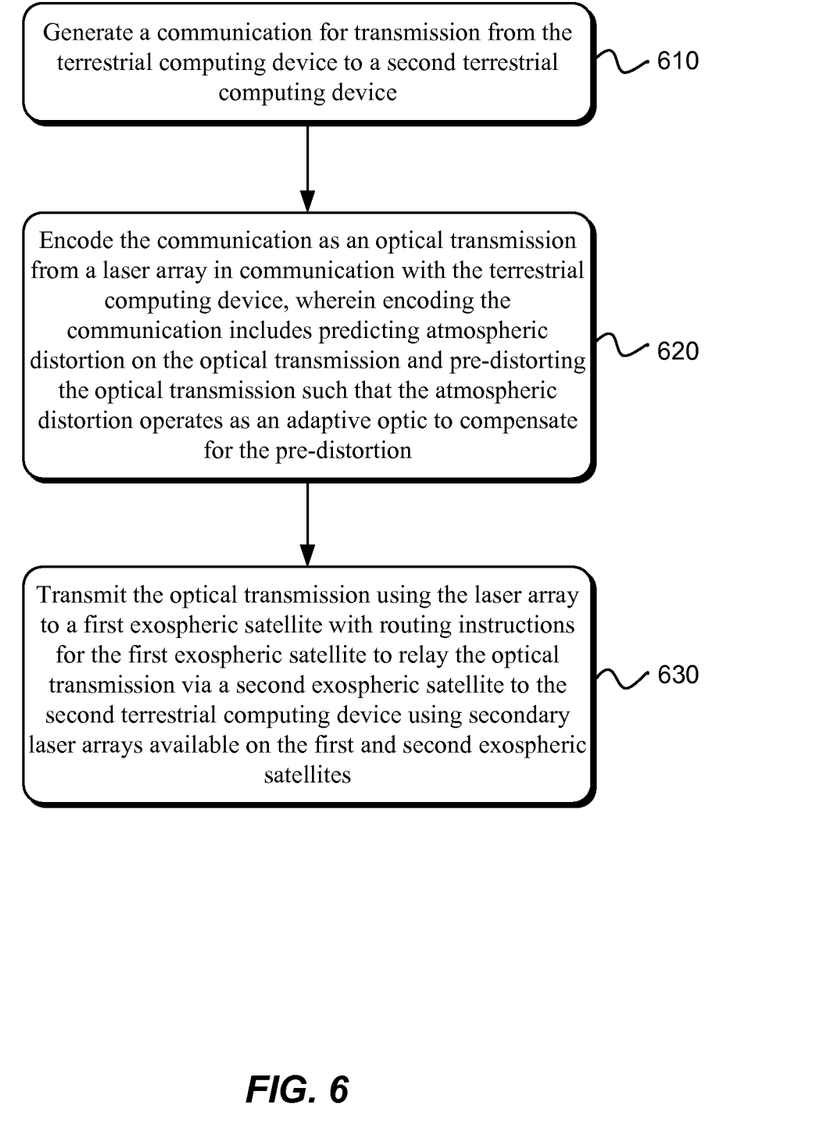
FIGS. 6-7 are flow diagrams for methods of communicating using satellites in accordance with examples of the present technology.
Figure 7:
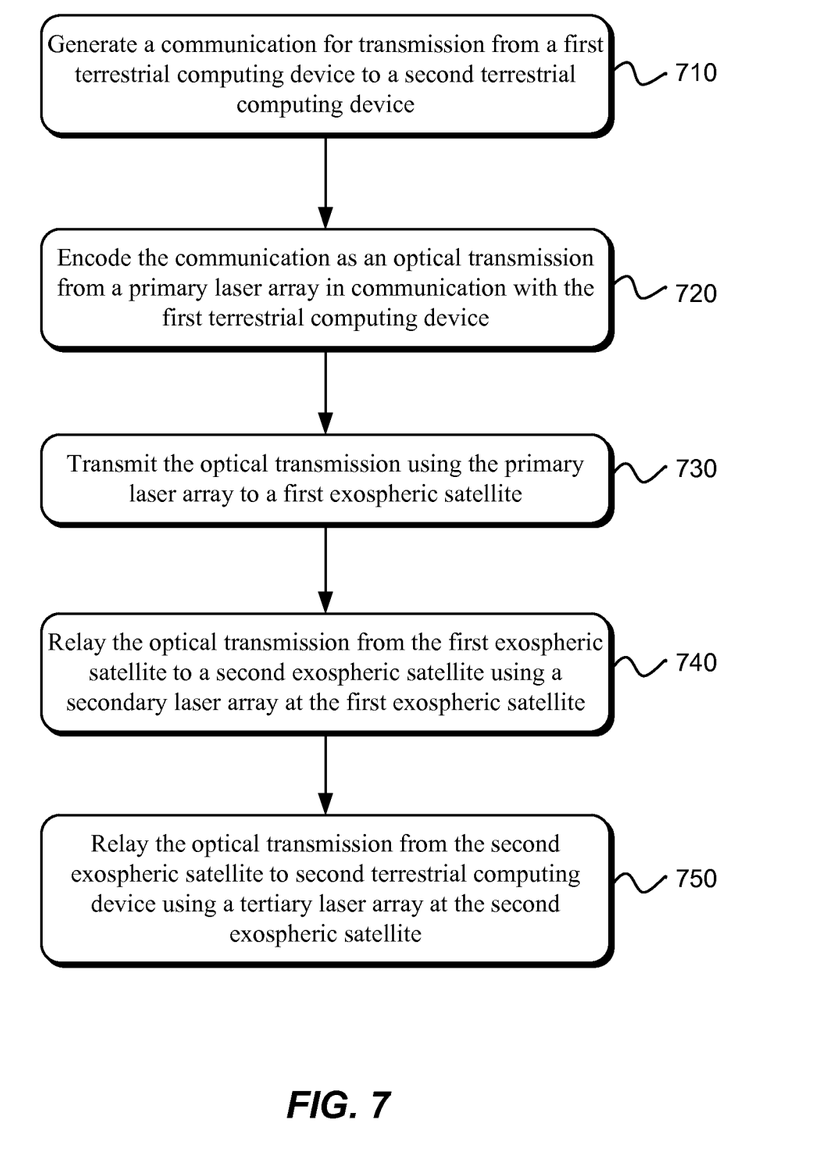

FIGS. 6-7 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 6, a flow diagram of a method is illustrated for providing laser communications. The method may include generating 610 a communication for transmission from a first terrestrial computing device to a second terrestrial computing device. For example, the communication may include one or more data packets. The communication may include instructions to the second terrestrial computing device to perform some operation. The communication may include data to be stored or processed. The communication may include instructions to forward the data packets to yet another computing device, terrestrial or otherwise. The communication may include confirmation of receipt of data from the second terrestrial computing device. Virtually any type of communication that is sent between computing devices using conventional communication technologies may be transmitted using the present technology.

The communication may be encoded 620 as an optical transmission. For example, the data packets to be transmitted may be encoded as signals of light to be emitted from a laser array in communication with the first terrestrial computing device. Encoding the communication may include predicting atmospheric distortion on the optical transmission and pre-distorting the optical transmission such that the atmospheric distortion operates as an adaptive optic to compensate for and correct the pre-distortion.

The optical transmission may be transmitted 630 using the laser array to the first satellite. In other words, the lasers may be caused to emit the signals of light representing the data packets in an encoded pattern which is decodable by the second terrestrial computing device, with distortions to the signals of light to be corrected by the atmosphere. Transmitting the optical signal using the laser array may include controlling firing of individual lasers in the laser array to generate the signals of light with the determined pre-distortion. The distortion of a signal may be referred to as a perturbation. By firing the individual lasers at different times based on the predicted atmospheric distortion, an inversely perturbed signal may be created.

The optical transmission may include routing instructions for the first satellite to relay the optical transmission to the second terrestrial computing device, via a second satellite, using second laser arrays available on the first and second satellites.

Each of the first and second satellites, as well as the first and second terrestrial computing devices, in addition to possessing laser arrays for emitting optical transmissions, may include optical detectors for detecting optical transmissions transmitted from another of the devices. The lasers in the laser arrays may be low power lasers and the optical detectors may be configured to detect the low power optical transmissions. In one example, the lasers in the laser array may be laser diodes configured for a power level less than 1 kW, or less than 100 W, or less than 10 W, or less than 1 W.

In some examples, this or other methods described herein may be implemented wholly or partially as computer readable program code executed by a processor and the computer readable code may be embodied on a non-transitory computer usable medium.

Referring now to FIG. 7, a flow diagram of a method is illustrated for implementing an asynchronous coding environment. The method may include generating 710 a communication for transmission from a first terrestrial computing device to a second terrestrial computing device and encoding 720 the communication as an optical transmission from a first laser array in communication with the first terrestrial computing device. The optical transmission may be transmitted 730, using the first laser array, to a first satellite and relayed 740 from the first satellite to a second satellite using a second laser array at the first satellite. The optical transmission may be further relayed 750 from the second satellite to the second terrestrial computing device using a third laser array at the second satellite. The lasers in the first, second and third laser arrays may be low power laser diodes configured for a power level less than 1 kW.

The method may include capturing imagery of the earth. The imagery may be captured using a camera on the first and/or second satellite(s). The imagery may be optically transmitted to the first or second terrestrial computing device and/or to other satellites.

The first and second satellites may be part of a mesh network of satellites. Each satellite in the mesh network may remain in line of sight with at least two other satellites in the mesh network. The mesh network may include satellites orbiting at differing altitudes. For example, tiers of orbiting satellites may be established within a range of altitudes from 200 km to 700 km or from 200 km to 1,000 km above sea level or above the surface of the Earth. The satellites at differing altitudes may be tiered to provide different degrees of latency of communications between the first and second terrestrial computing devices. The satellites at differing altitudes may also be tiered to provide different levels of Quality of Service (QoS) for communications between the first and second terrestrial computing devices.

The laser arrays may be operated within radio frequency atmospheric windows selected to minimize interaction with molecules in the atmosphere. For example, the first, second and/or third laser arrays may be operated within a radio window of from 3 kHz to 300 GHz. Alternatively, the first, second and/or third laser arrays may be operated within a visible light atmospheric window of from 430-790 THz.

The method may include operating the satellites as at least a portion of a data center. For example, the method may include instructing the first or second satellites to perform calculations using a processor or to store data in a data store. A non-earth celestial body may be a location of at least a portion of a data center. The optical transmission may be transmitted from the first satellite to the non-earth celestial body for processing before transmitting the optical transmission to the second satellite or to a terrestrial location.

Figure 8:
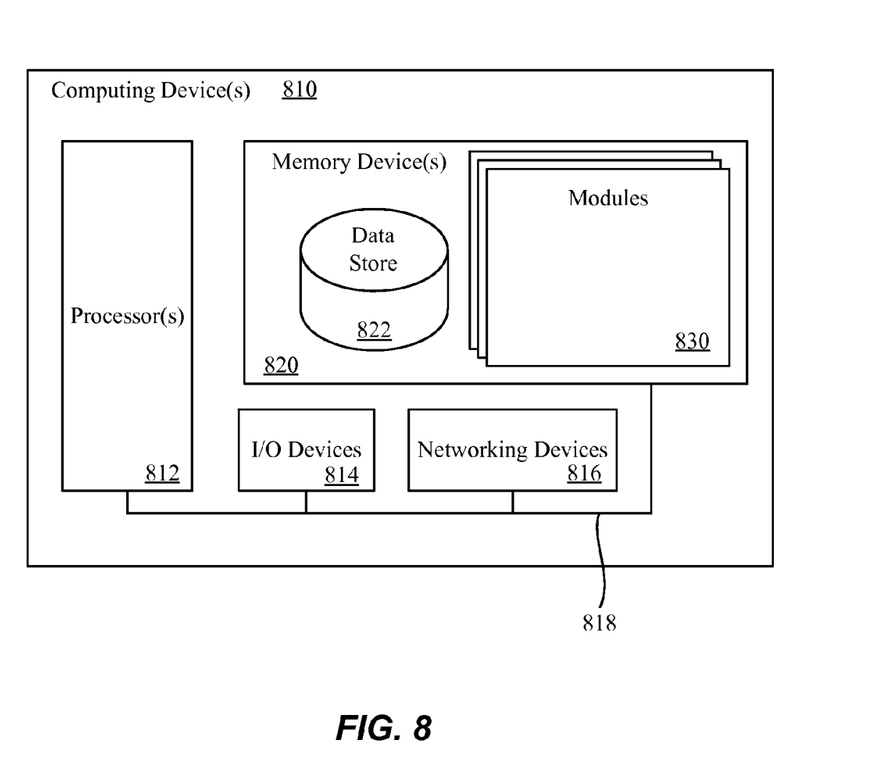
FIG. 8 is a block diagram of a computing system for use in satellite communication in accordance with an example of the present technology.

FIG. 8 illustrates a computing device 810 on which services or modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 830 that are executable by the processor(s) and data for the modules. A data store 822 may also be located in the memory device 820 for storing data related to the modules and other applications along with an operating system that is executable by the processor(s) 812.

The computing device 810 may further include or be in communication with a client device, which may include a display device. The client device may be available for an administrator to use in interfacing with the computing device 810, such as to review operation of a virtual computing instance, make improvements to machine learning models and so forth.

Various applications may be stored in the memory device 820 and may be executable by the processor(s) 812. Components or modules discussed in this description that may be implemented in the form of software using high programming level languages that are compiled, interpreted or executed using a hybrid of the methods.

The computing device 810 may also have access to I/O (input/output) devices 814 that are usable by the computing devices. An example of an I/O device 814 is a display screen that is available to display output from the computing devices. Other known I/O device may be used with the computing device as desired. Networking devices 816 and similar communication devices may be included in the computing device 810. The networking devices 816 may be wired or wireless networking devices 816 that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor 812. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method being implemented on a computer, comprising:
   receiving an optical transmission signal at a first satellite with a processor and memory from a first laser array associated with a first terrestrial computing device, wherein the optical transmission signal is encoded with a pre-distortion to compensate and correct for atmospheric signal perturbations;
   relaying the optical transmission signal from the first satellite to a second satellite using a second laser array at the first satellite; and
   relaying the optical transmission signal from the second satellite to a second terrestrial computing device using a third laser array at the second satellite;
   wherein lasers in the first, second and third laser arrays are laser diodes configured for a power level less than 1 kW.

2. The method of claim 1, further comprising capturing imagery of earth using a camera on the first or second satellite and optically transmitting the imagery to the first or second terrestrial computing device.

3. The method of claim 1, wherein the first and second satellites are part of a mesh network of satellites, where each satellite in the mesh network remains in line of sight with at least two other satellites in the mesh network.

4. The method of claim 3, wherein the mesh network includes satellites at differing altitudes ranging from 200 km and 700 km above sea level.

5. The method of claim 4, wherein the satellites at differing altitudes are tiered to provide different degrees of latency of communications between the first and second terrestrial computing devices.

6. The method of claim 4, wherein the satellites at differing altitudes are tiered to provide different levels of Quality of Service (QoS) for communications between the first and second terrestrial computing devices.

7. The method of claim 1, further comprising modulating a carrier wave of the first, second or third laser arrays within a radio frequency atmospheric window of from 3 kHz to 300 GHz.

8. The method of claim 1, further comprising operating the first, second or third laser arrays within a visible light range of from 430-790 THz.

9. The method of claim 1, further comprising instructing the first or second satellites to perform calculations using a processor or to store data in a data store associated with a computing device.

10. The method of claim 1, further comprising transmitting the optical transmission signal from the first satellite to a non-earth celestial body for processing before transmitting the optical transmission signal to the second satellite.

11. The method of claim 1, further comprising transmitting the optical transmission signal from the first laser array to a non-earth celestial body for processing before transmitting the optical transmission signal to the first satellite.

12. The method of claim 1, wherein the first and second satellites are exospheric or thermospheric satellites.

13. The method of claim 1, wherein a volume of the first satellite is one liter or less, the first satellite has dimensions of a 10 cm cube or smaller, the first satellite has a mass of 1.33 kg or less, and the first satellite is mechanically coupleable to a third satellite having a same volume or same dimensions as the first satellite.

* * * * *